(12) United States Patent
Hoyle

(10) Patent No.: US 10,415,746 B2
(45) Date of Patent: Sep. 17, 2019

(54) VERTICAL SUPPORT BRACKET FOR SELF-LEVELING DEVICES

(71) Applicant: Gary C. Hoyle, Cumming, GA (US)

(72) Inventor: Gary C. Hoyle, Cumming, GA (US)

(73) Assignee: G.C. Hoyle Company LLC, Cumming, GA (US)

( * ) Notice: Subject to any disclaimer, the term of this patent is extended or adjusted under 35 U.S.C. 154(b) by 0 days.

(21) Appl. No.: 15/884,487

(22) Filed: Jan. 31, 2018

(65) Prior Publication Data

US 2019/0234556 A1 Aug. 1, 2019

(51) Int. Cl.
| | |
|---|---|
| *F16M 13/02* | (2006.01) |
| *F16M 11/28* | (2006.01) |
| *F16M 11/16* | (2006.01) |
| *H01Q 1/12* | (2006.01) |
| *F16M 11/24* | (2006.01) |
| *B25H 1/06* | (2006.01) |

(52) U.S. Cl.
CPC ............ *F16M 13/02* (2013.01); *F16M 11/16* (2013.01); *F16M 11/24* (2013.01); *F16M 11/28* (2013.01); *H01Q 1/12* (2013.01); *B25H 1/06* (2013.01); *F16M 2200/027* (2013.01); *H01Q 1/1228* (2013.01); *H01Q 1/1235* (2013.01); *H01Q 1/1242* (2013.01)

(58) Field of Classification Search
CPC ........ H01Q 1/1235; H01Q 1/125; H01Q 1/12; H01Q 1/1242; H01Q 1/1228; F16M 11/16; F16M 2200/027; F16M 11/28; B25H 1/06; E04G 7/16; E04G 7/14; E04G 7/18

USPC ....... 248/165, 170, 411, 529, 541, 534, 168, 248/163.1, 519; 182/185.1
See application file for complete search history.

(56) References Cited

U.S. PATENT DOCUMENTS

| | | | | |
|---|---|---|---|---|
| 418,938 | A * | 1/1890 | Bogusch et al. ......... | E04G 1/32 182/182.3 |
| 453,200 | A * | 6/1891 | Melcher et al. ......... | E04G 1/32 182/182.3 |
| 764,865 | A * | 7/1904 | Read ........................ | E04G 1/32 182/182.5 |
| 805,524 | A * | 11/1905 | Bryant ................... | F16M 11/24 182/132 |
| 1,144,726 | A * | 6/1915 | Robinson et al. ..... | F16M 11/20 248/165 |
| 1,220,299 | A * | 3/1917 | Viden .................... | A01K 97/10 248/538 |

(Continued)

*Primary Examiner* — Jonathan Liu
*Assistant Examiner* — Taylor L Morris
(74) *Attorney, Agent, or Firm* — Frost Brown Todd LLC

(57) ABSTRACT

A support bracket for use with self-leveling devices, wherein the support bracket includes two identical sections attached to one another, and wherein each section further includes a first upwardly-angled side portion that further includes a slot formed horizontally therein and a semi-cylindrical channel formed vertically therein, and wherein the slot and semi-cylindrical channel intersect one another in a perpendicular manner; a second upwardly-angled side portion that further includes a slot formed horizontally therein and a semi-cylindrical channel formed vertically therein, and wherein the slot and semi-cylindrical channel intersect one another in a perpendicular manner; and a middle portion positioned between the first and second upwardly-angled side portions that further includes a semi-cylindrical channel formed vertically therein.

14 Claims, 6 Drawing Sheets

(56) References Cited

U.S. PATENT DOCUMENTS

| | | | | |
|---|---|---|---|---|
| 1,496,465 A * | 6/1924 | Jackson | D06F 1/00 | 248/165 |
| 1,566,171 A * | 12/1925 | Spurr | E04G 1/32 | 182/182.5 |
| 2,165,221 A * | 7/1939 | Burton | E04G 7/24 | 24/335 |
| 2,171,870 A * | 9/1939 | Swartz | F16M 11/14 | 16/235 |
| 2,174,459 A * | 9/1939 | Borsetti | E04G 7/16 | 403/312 |
| 2,317,444 A * | 4/1943 | Dalton | B25H 1/06 | 182/226 |
| 2,426,240 A * | 8/1947 | Bednash | H01Q 1/1235 | 248/188.7 |
| 2,461,762 A * | 2/1949 | O'Donnell | E04G 7/14 | 403/173 |
| 2,647,803 A * | 8/1953 | Bohm | B25H 1/06 | 182/224 |
| 2,650,140 A * | 8/1953 | Boitos | A47B 13/021 | 182/224 |
| 2,705,603 A * | 4/1955 | Bitz | H01Q 1/1228 | 24/332 |
| 2,989,142 A * | 6/1961 | Gill | B25H 1/06 | 182/224 |
| 3,007,727 A * | 11/1961 | Ryan | E04G 7/14 | 403/169 |
| 3,080,139 A * | 3/1963 | Caprioli | E01F 9/688 | 116/173 |
| 3,082,027 A * | 3/1963 | Johnson | E04G 7/06 | 182/185.1 |
| 3,126,186 A * | 3/1964 | Halligan | B25H 1/06 | 182/129 |
| 3,126,191 A * | 3/1964 | Holden | F16B 2/065 | 248/286.1 |
| 3,175,642 A * | 3/1965 | Neeley | E04G 1/32 | 182/185.1 |
| 3,178,143 A * | 4/1965 | Gustin | F16M 11/16 | 248/168 |
| 3,201,080 A * | 8/1965 | Rose | F16M 11/36 | 248/156 |
| 3,495,857 A * | 2/1970 | Hawke | E04B 1/5831 | 403/57 |
| 3,567,166 A * | 3/1971 | Grandjean | B41J 29/06 | 248/170 |
| 3,591,113 A * | 7/1971 | Foster, Jr. | H01Q 1/1242 | 248/163.1 |
| 3,606,409 A * | 9/1971 | Hawkins, Jr. | F16B 7/1418 | 248/411 |
| 3,848,701 A * | 11/1974 | Hughes | B25H 1/06 | 108/156 |
| 3,926,393 A * | 12/1975 | Tainsh | F16M 13/00 | 211/60.1 |
| 3,944,175 A * | 3/1976 | Kearney | E21F 17/02 | 248/59 |
| 3,963,207 A * | 6/1976 | Guasti | F16M 11/16 | 248/168 |
| 4,020,531 A * | 5/1977 | Ahrens | F16L 3/1008 | 24/284 |
| 4,030,565 A * | 6/1977 | Chaput | B25H 1/06 | 182/151 |
| 4,132,178 A * | 1/1979 | Mueller | A47B 57/265 | 108/147.14 |
| 4,214,841 A * | 7/1980 | Hayashi | E04G 7/14 | 403/188 |
| 4,317,552 A * | 3/1982 | Weidler | F16M 11/16 | 211/203 |
| 4,366,940 A * | 1/1983 | Vargas | F16M 11/046 | 248/170 |
| 4,438,896 A * | 3/1984 | Hall | F16M 11/046 | 248/168 |
| 4,536,102 A * | 8/1985 | Doyle | E04G 7/18 | 403/390 |
| 4,629,150 A * | 12/1986 | O'Callaghan | F16M 11/22 | 248/163.1 |
| 4,736,921 A * | 4/1988 | Zane | B62J 11/00 | 224/935 |
| 4,878,303 A * | 11/1989 | Banniza | G09F 7/20 | 40/606.14 |
| 4,890,952 A * | 1/1990 | Jones | B25H 1/06 | 182/185.1 |
| 5,020,935 A * | 6/1991 | Lewis | F16B 7/0493 | 403/391 |
| 5,042,773 A * | 8/1991 | Johansen | A47F 5/08 | 248/229.23 |
| 5,078,355 A * | 1/1992 | Fujimoto | F16M 11/10 | 248/183.2 |
| 5,115,542 A * | 5/1992 | Gehres | F16L 3/2235 | 24/339 |
| 5,660,366 A * | 8/1997 | Palmer | F16M 11/14 | 248/167 |
| 5,794,897 A * | 8/1998 | Jobin | H02G 7/053 | 24/459 |
| 5,941,483 A * | 8/1999 | Baginski | F16L 3/22 | 248/68.1 |
| 6,283,425 B1 * | 9/2001 | Liljevik | H01Q 1/125 | 248/218.4 |
| 6,572,061 B2 * | 6/2003 | Overbeck | A47C 4/20 | 248/163.1 |
| 6,761,249 B2 * | 7/2004 | Garcia | A47F 5/13 | 182/153 |
| 6,783,101 B2 * | 8/2004 | Knotts | F16L 3/2235 | 211/60.1 |
| 6,789,774 B2 * | 9/2004 | Painchaud | A45B 25/12 | 248/229.14 |
| 6,905,110 B2 * | 6/2005 | Brown | E04F 11/1812 | 248/519 |
| 6,951,326 B2 * | 10/2005 | Vanover | F16M 11/16 | 248/170 |
| 7,007,900 B2 * | 3/2006 | Goodwin | H02G 7/053 | 248/68.1 |
| 7,021,424 B2 * | 4/2006 | Herman | B25H 1/06 | 182/224 |
| 7,369,097 B1 * | 5/2008 | Sherwood | H01Q 1/1235 | 343/757 |
| 7,469,771 B2 * | 12/2008 | Thompson | A62B 1/06 | 182/186.7 |
| 7,484,698 B2 * | 2/2009 | Budagher | F16L 3/11 | 174/40 R |
| 7,604,208 B2 * | 10/2009 | Tacklind | F16M 11/36 | 248/170 |
| 7,770,851 B2 * | 8/2010 | Michaud | F16L 3/04 | 248/65 |
| 8,162,557 B2 * | 4/2012 | Van Zile, III | B25J 15/0052 | 403/385 |
| 8,308,770 B2 * | 11/2012 | Moumene | A61B 17/7004 | 606/255 |
| 8,770,537 B2 * | 7/2014 | Go | E02F 9/2275 | 212/347 |
| 8,863,430 B2 * | 10/2014 | Poling | F41A 23/08 | 248/163.1 |
| 9,004,806 B2 * | 4/2015 | Chau | E04G 5/12 | 403/338 |
| 2003/0213648 A1 * | 11/2003 | Dembicks | B23D 47/025 | 182/185.1 |
| 2009/0249591 A1 * | 10/2009 | Melic | E04G 7/14 | 24/517 |
| 2011/0012007 A1 * | 1/2011 | Brewer | E04H 4/1254 | 248/514 |
| 2015/0056002 A1 * | 2/2015 | Olds | F16M 11/16 | 403/176 |
| 2017/0014987 A1 * | 1/2017 | King | B25H 1/06 | |

* cited by examiner

VERTICAL SUPPORT BRACKET FOR SELF-LEVELING DEVICES

BACKGROUND OF THE INVENTION

The described invention relates in general to self-leveling or self-adjusting supports of various types, and more specifically to a support bracket or support bracket assembly for use with self-leveling or self-adjusting support devices that support vertically oriented items or other items.

Substantially flat or planar platforms are common utilitarian components found in many items including tables; benches; chairs; cooking surfaces; work surfaces; elevated storage containers; hunting, fishing, and camping products; and many others. Most of these platforms are most useful when they are in a level position (i.e., positioned horizontally). However, placing and holding a substantially flat or planar platform in a level position can be challenging, particularly when the surface or substrate upon which the platform is placed is uneven. In restaurants, coffee shops, and other establishments, encountering tables or chairs that wobble or tilt, or that are otherwise unstable is a common and annoying occurrence for many people. An unstable table or chair is also more likely to collapse or fall over, thereby creating a risk of injury to the person using the item. Furthermore, an unstable work platform may present a significant safety hazard, particularly if the platform is being used for activity that involves sawing or other reciprocating motion that would encourage the work platform to tip over or collapse. Legs or other support structures attached to such platforms may be collapsible, foldable, or adjustable with regard to height and/or angle relative to the platform itself; however, these support structures are not typically adjustable with regard to maintaining the platform in a level position when the platform is sitting on an uneven substrate.

Self-adjusting support assemblies for use on uneven substrates or surfaces are described in U.S. Pat. Nos. 9,140,401 and 9,453,608, which are incorporated herein by reference, in their entirety, for all purposes. U.S. Pat. Nos. 9,140,401 and 9,453,608 both teach a self-adjusting support assembly for use on uneven surfaces that includes: (a) a support element (e.g., a platform, work surface, tabletop, or seat); (b) at least one pivoting leg assembly positioned beneath the support element; and (c) at least one self-adjusting attachment assembly connecting the support element to the at least one pivoting leg assembly. Each self-adjusting attachment assembly includes: (i) a bracket that is adapted to attach to the support element; and (ii) a proximal head portion that is adapted to rotationally cooperate with the bracket and to receive the pivoting leg assembly. The bracket includes: (i) a receiving channel formed therein that is positioned along a predetermined angled axis of insertion; and (ii) a locking ridge positioned within the receiving channel. The proximal head portion includes: (i) a flange formed at one end thereof that rotationally engages the locking ridge; (ii) a stem positioned beneath the flange that rotationally engages the receiving channel; and (iii) a receiving portion positioned beneath the stem that is adapted to receive the pivoting leg assembly.

The self-adjusting attachment assemblies taught by U.S. Pat. Nos. 9,140,401 and 9,453,608 can be attached to and effectively used with almost any type of platform, and many types of pre-existing devices (tables, benches, chairs, stools etc.) can be modified by retrofitting to include the self-adjusting attachment assemblies and the pivoting leg assemblies with which the self-adjusting attachment assemblies are designed to work. However, the self-adjusting attachment assemblies taught by U.S. Pat. Nos. 9,140,401 and 9,453,608 are typically configured for use with horizontal platforms and supports and are not necessarily intended for use with vertically oriented posts or poles that support items such as satellite dishes or parabolic acoustic discs, dishes, or mirrors. Accordingly, there is an ongoing need for a vertically oriented support bracket for use with self-leveling leg and support assemblies such as those taught by U.S. Pat. Nos. 9,140,401 and 9,453,608.

SUMMARY OF THE INVENTION

The following provides a summary of certain exemplary embodiments of the present invention. This summary is not an extensive overview and is not intended to identify key or critical aspects or elements of the present invention or to delineate its scope. However, it is to be understood that the use of indefinite articles in the language used to describe and claim the present invention is not intended in any way to limit the described system. Rather the use of "a" or "an" should be interpreted to mean "at least one" or "one or more".

In accordance with one aspect of the present invention, a support bracket section for use with self-leveling devices is provided. This support bracket section includes a first upwardly-angled side portion that further includes an angled slot formed therein and an angled semi-cylindrical channel formed therein, and wherein the slot and semi-cylindrical channel intersect one another in a perpendicular manner; a second upwardly-angled side portion that further includes an angled slot formed therein and an angled semi-cylindrical channel formed therein, wherein the slot and semi-cylindrical channel intersect one another in a perpendicular manner; and a middle portion positioned between the first and second upwardly-angled side portions, wherein the middle portion further includes a semi-cylindrical channel formed vertically therein.

In accordance with another aspect of the present invention, a vertical support bracket or support bracket assembly for use with self-leveling devices is provided. This vertical support bracket includes a first section and a second section that is adapted to be attached to the first section in a reversed and opposite configuration (i.e., face-to-face). Each bracket section includes a first upwardly-angled side portion that further includes an angled slot formed therein and an angled semi-cylindrical channel formed therein, wherein the slot and semi-cylindrical channel intersect one another in a perpendicular manner; a second upwardly-angled side portion that further includes an angled slot formed therein and an angled semi-cylindrical channel formed therein, wherein the slot and semi-cylindrical channel intersect one another in a perpendicular manner; and a middle portion positioned between the first and second upwardly-angled side portions, wherein the middle portion further includes a semi-cylindrical channel formed vertically therein.

In yet another aspect of this invention, a support bracket for use with self-leveling devices is provided. This support bracket includes a vertically-oriented first section and a vertically-oriented second section that is adapted to be attached to the first section in a reversed and opposite configuration (i.e., face-to-face). Each bracket section includes a first upwardly-angled side portion that further includes an angled slot formed therein and an angled semi-cylindrical channel formed therein, wherein the slot and semi-cylindrical channel intersect one another in a perpendicular manner; a second upwardly-angled side portion that further includes an angled slot formed therein and an angled semi-cylindrical channel formed therein, wherein the slot and semi-cylindrical channel intersect one another in a perpendicular manner; and a middle portion positioned between the first and second upwardly-angled side portions, wherein the middle portion further includes a semi-cylindrical channel formed vertically therein. Each slot and semi-cylindrical channel formed in the first and second bracket sections (i.e., the side sections) is adapted to receive a pivot device attached to a leg assembly, wherein the pivot device includes a flange that corresponds to a slot and a stem that corresponds to a semi-cylindrical channel.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein.

DETAILED DESCRIPTION OF THE INVENTION

Figure 1:
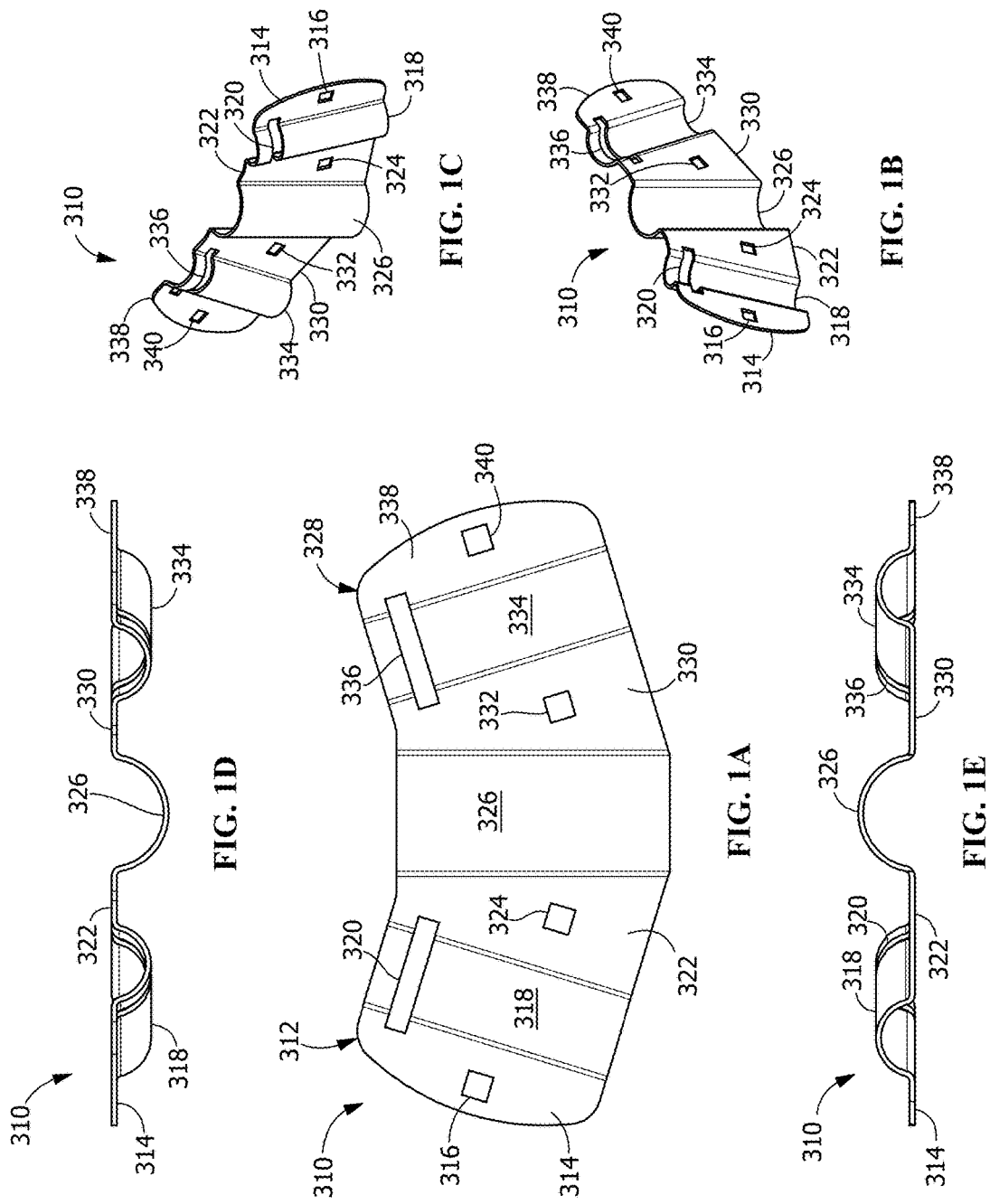
FIG. 1A is a front view of a first section of a vertical support bracket for use with certain self-adjusting or self-leveling leg assemblies, in accordance with an exemplary embodiment of the present invention.
FIG. 1B is a front perspective view of the vertical support bracket section shown in FIG. 1A.
FIG. 1C is a rear perspective view of the vertical support bracket section shown in FIG. 1A.
FIG. 1D is a top view of the vertical support bracket section shown in FIG. 1A.
FIG. 1E is a bottom view of the vertical support bracket section shown in FIG. 1A.

Exemplary embodiments of the present invention are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

The present invention provides a vertically-oriented support bracket for use with the self-leveling devices described in U.S. Pat. Nos. 9,140,401 and 9,453,608 and other systems and devices. The STABLZ® family of products provides various platforms that are supported by sets of triangular legs that operate to "self-level" these platforms on uneven substrates. Within the context of this invention and in describing the STABLZ® products generally, the phrase "self-leveling" refers to the mechanical relationship between the platform, the legs (which are typically triangular in overall shape) that support the platform, and the bracket assembly that attaches the legs to the platform. The bracket assembly receives and houses the legs in a manner that permits the upper portion of the legs to rotate and pivot, independent of one another, thereby permitting a user of the device to orient the platform in a level position even if the bottom portions of the legs are resting on an uneven substrate or surface. However, the self-adjusting attachment assemblies taught by U.S. Pat. Nos. 9,140,401 and 9,453,608 are generally configured for use with horizontal platforms and supports and are not necessarily intended for use with vertically oriented posts or poles that support items such as satellite dishes or parabolic acoustic discs, dishes, or mirrors. Accordingly, this invention provides a vertically oriented support bracket or support bracket assembly for use with self-leveling or self-adjusting attachment devices and assemblies such as those taught by U.S. Pat. Nos. 9,140,401 and 9,453,608. This vertical support bracket may be plastic, polymer, metal, or a combination thereof, or any other suitably durable material or materials.

Figure 2:
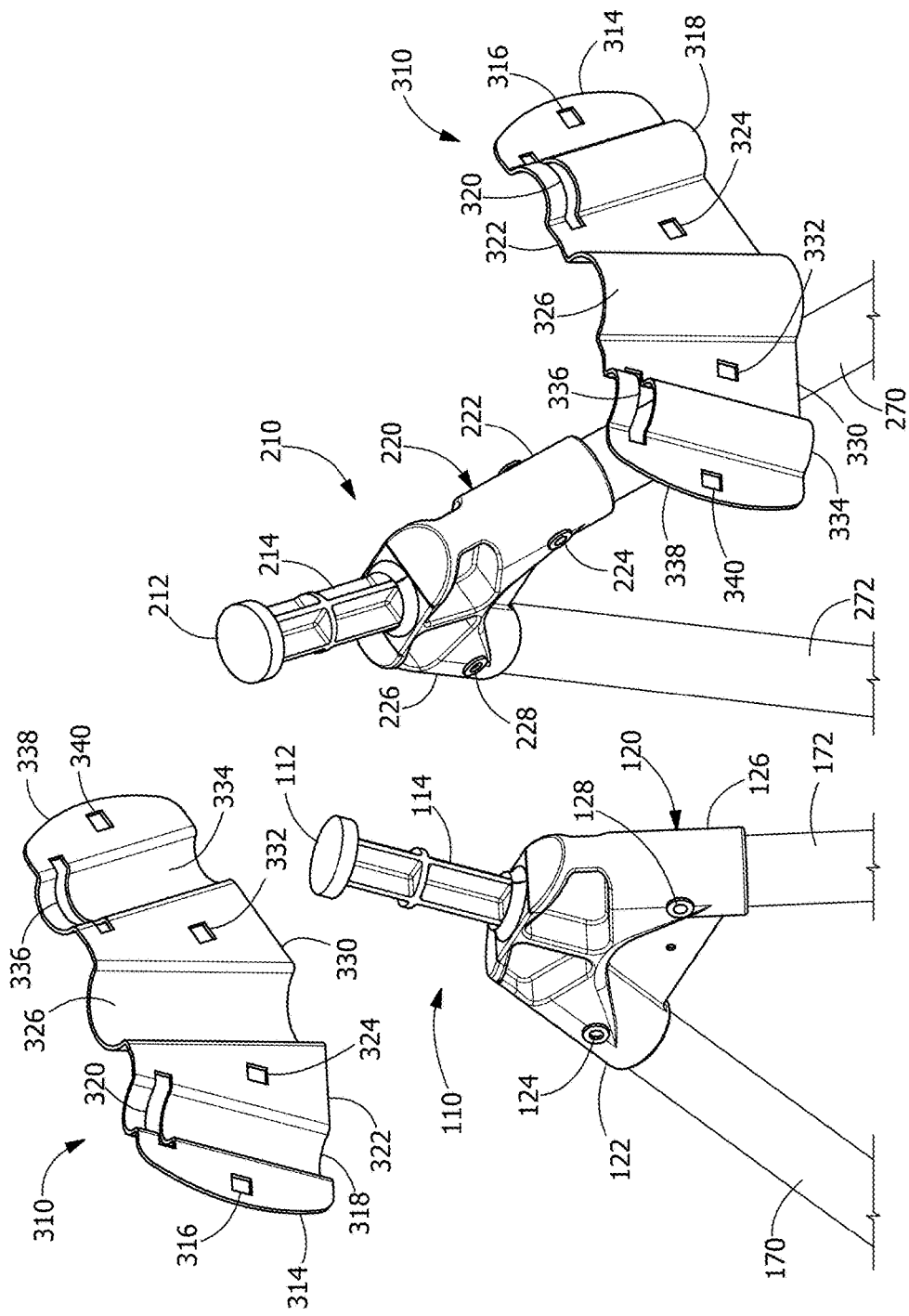
FIG. 2 is an exploded view of an exemplary vertical support bracket (front and rear sections) shown in combination with the upper sections of two pivoting leg assemblies with which the vertical support bracket is adapted to function.
Figure 3:
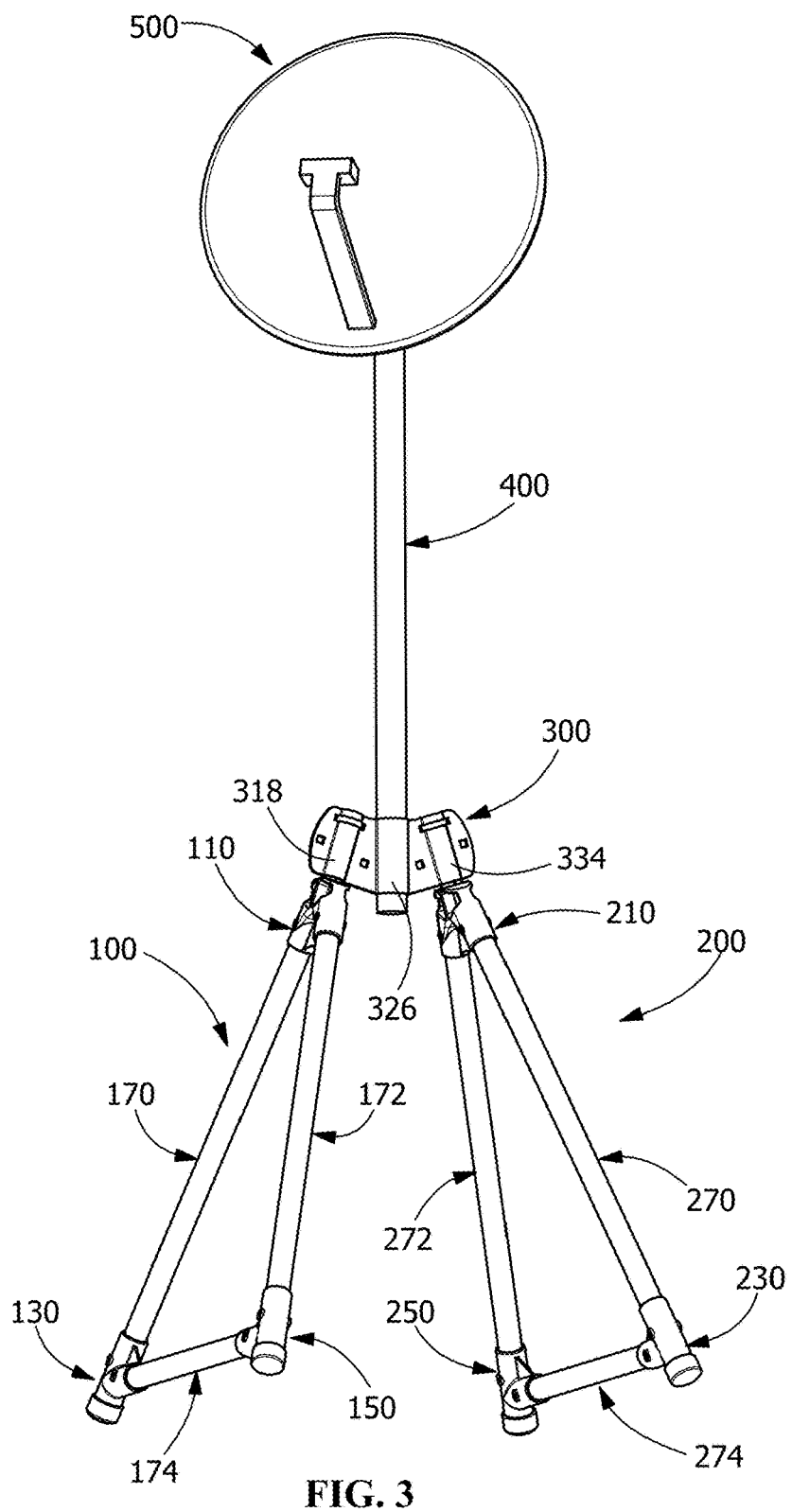
FIG. 3 is a front view of an exemplary embodiment of the present invention, wherein the vertical support bracket being supported by two pivoting leg assemblies, and wherein the vertical support bracket is supporting a post to which a satellite dish has been mounted.
Figure 4:
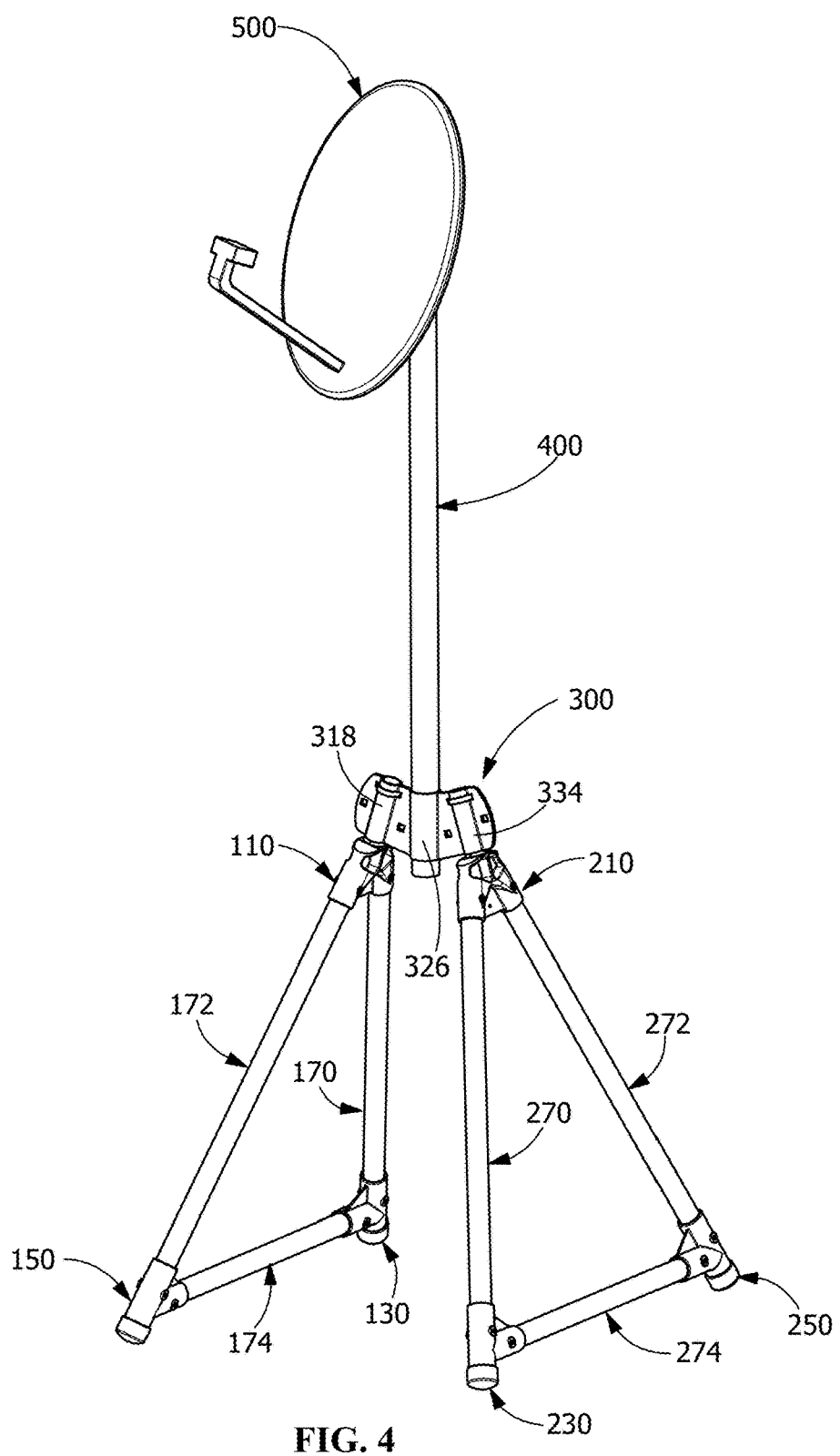
FIG. 4 is a front perspective view of the apparatus shown in FIG. 3.
Figure 5:
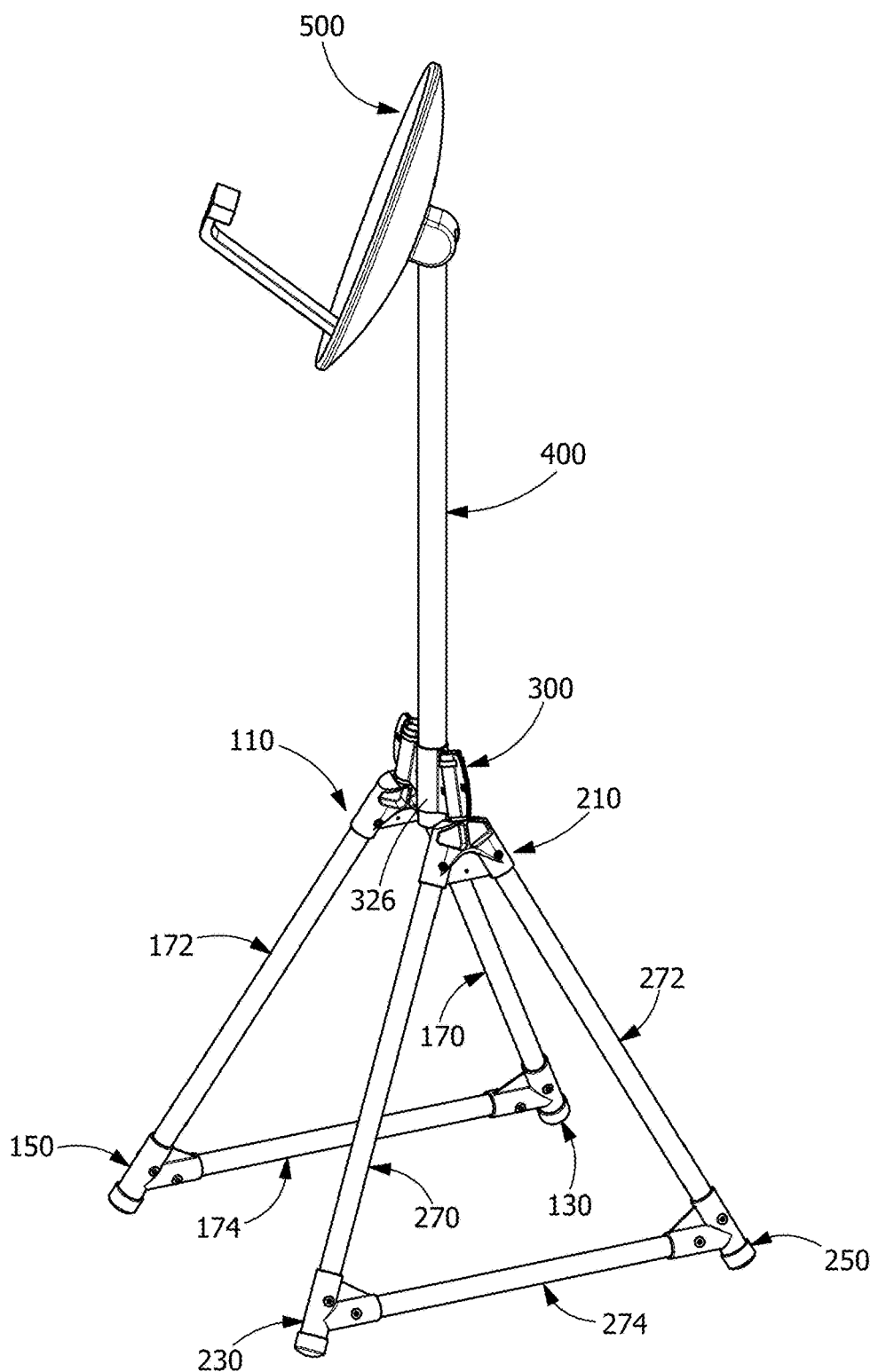
FIG. 5 is a side perspective view of the apparatus shown in FIG. 3.
Figure 6:
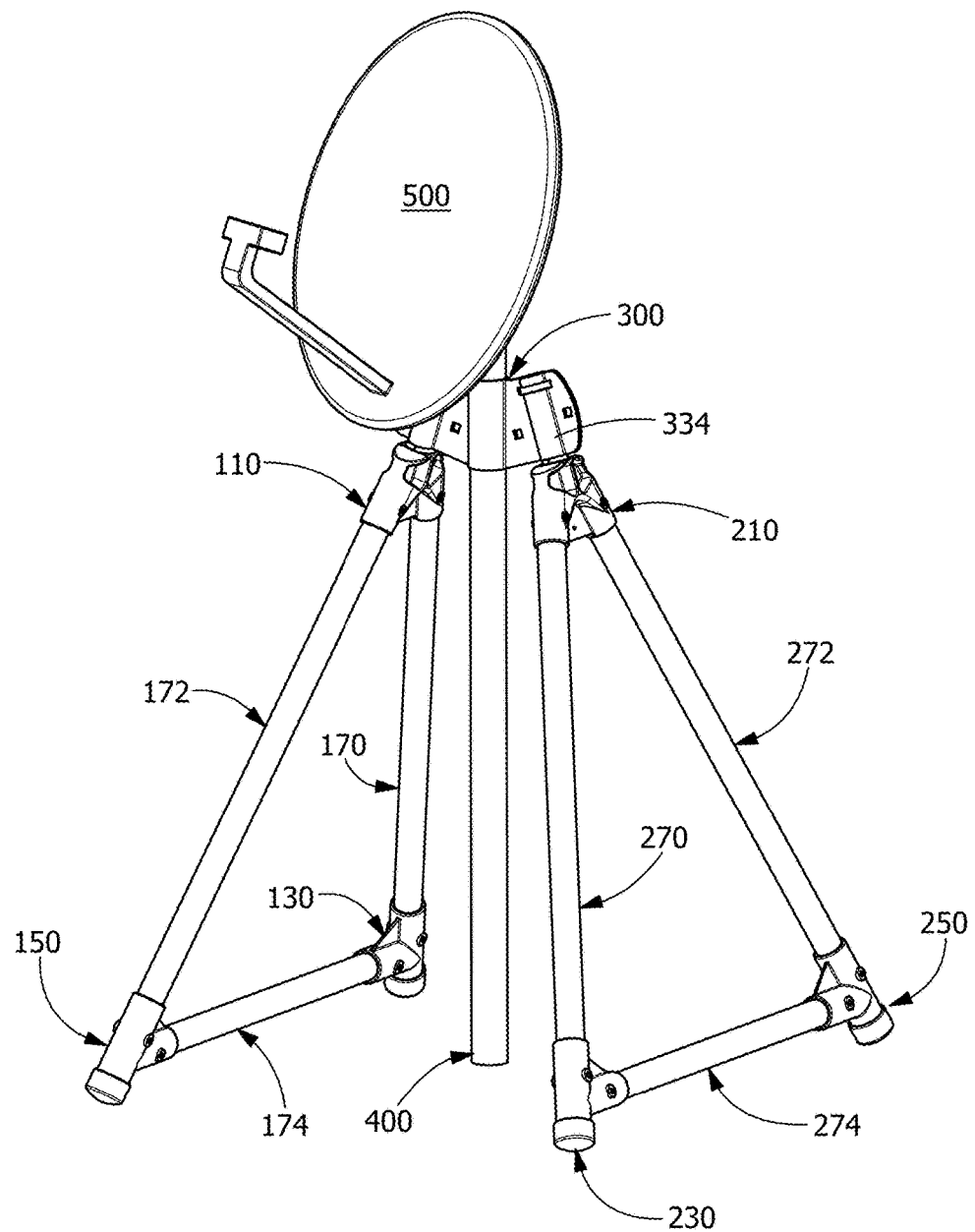
FIG. 6 is a side perspective view of the apparatus shown in FIG. 3, wherein the post and satellite dish have been lowered to facilitate moving and storing the apparatus.

With reference now to the Figures, FIGS. 1A-E provide various views of one half of exemplary vertical support bracket 300, which is intended for use with pivoting and rotating leg assemblies 100 and 200, as shown in FIGS. 2-6. With reference to FIGS. 1A-E and FIG. 2, vertical bracket (or vertical bracket assembly) 300 includes a first section and a second section, which is identical to the first section (see FIG. 2), and which is attached thereto or mounted thereon to form the entire functional bracket. As best shown in FIG. 2, the two identical sections of vertical support bracket 300 are oriented face-to-face and attached to one another using attachment members such as bolts, screws, studs, pins, rivets, or any other suitable mechanical means for attachment or connection. Bracket sections 310 may be detachably connected to one another or permanently connected to one another. In some embodiments, the distance between the two halves of vertical support bracket 300 may be adjusted (i.e., increased or decreased) by loosening or tightening the bolts, wing nuts, or other mechanical devices used to connect the bracket sections to one another.

Again with reference to FIGS. 1A-E and FIG. 2, each exemplary bracket section 310 of vertical bracket 300 includes first angled portion 312, which further includes first flat surface 314, first square punch 316, first tubular portion 318, first slot 320, second flat surface 322, and second square punch 324; and second angled portion 328, which further includes third flat surface 330, third square punch 332, third tubular portion 334, second slot 336, fourth flat surface 338, and fourth square punch 340. Second tubular portion 326 is positioned between first angled portion 312 and second angled portion 328.

With reference to FIGS. 2-6, first leg assembly 100 includes first pivot device 110, which further includes flange 112 and stem 114; and upper leg receptacle 120, which further includes first leg-receiving portion 122, first bolt or rivet 124 for securing the upper portion of first leg 170 within first leg-receiving portion 122, second leg-receiving portion 126, and second bolt or rivet 128, for securing the upper portion of second leg 172 within second leg-receiving portion 126. First corner leg receptacle 130 includes a leg-receiving portion for securely receiving the bottom portion of leg 170 therein, and a crossbar-receiving portion for receiving one side of crossbar 174 securely therein. Second corner leg receptacle 150 includes a leg-receiving portion for securely receiving the bottom portion of second leg 172 therein, and a crossbar-receiving portion for receiving the other side of crossbar 174 securely therein.

Again, with reference to FIGS. 2-6, second leg assembly 200 includes second pivot device 210, which further includes flange 212 and stem 214; and upper leg receptacle 220, which further includes first leg-receiving portion 222, first bolt or rivet 224 for securing the upper portion of first leg 270 within first leg-receiving portion 222, second leg-receiving portion 226, and second bolt or rivet 228, for securing the upper portion of second leg 272 within second leg-receiving portion 226. First corner leg receptacle 230 includes a leg-receiving portion for securely receiving the bottom portion of first leg 270 therein, and a crossbar-receiving portion for receiving one side of crossbar 274 securely therein. Second corner leg receptacle 250 includes a leg-receiving portion for securely receiving the bottom portion of second leg 272 therein, and a crossbar-receiving portion for receiving the other side of crossbar 274 securely therein.

When vertical support bracket 300 is fully assembled, flange 112 and stem 114 of first pivot device 110 are disposed within first slot 320 and first tubular portion 318 respectively, in a manner that permits first pivot device 110 to pivot and rotate within vertical bracket 300. Likewise, when vertical support bracket 300 is fully assembled, flange 212 and stem 214 of second pivot device 210 are disposed within second slot 336 and second tubular portion 334 respectively, in a manner that permits second pivot device 210 to pivot and rotate within vertical bracket 300, independent of first pivot device 110. The independent pivoting and rotating of first and second leg assemblies 100 and 200 within vertical support bracket 300 permits any apparatus that includes these components to self-level or self-adjust to a level position when situated on an uneven surface or substrate. For example, in FIGS. 3-6, vertical support bracket 300 and first and second leg assemblies 100 and 200 are used to flexibly support satellite dish 500, which has been mounted on center post 400. Other leg assemblies are compatible with vertical support bracket 300, such as the leg assemblies disclosed in U.S. patent application Ser. No. 15/878,730, which is incorporated by reference herein, in its entirety for all purposes.

While the present invention has been illustrated by the description of exemplary embodiments thereof, and while the embodiments have been described in certain detail, there is no intention to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the general inventive concept.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, and by way of example, a description of a technology in the "Background" is not to be construed as an admission that certain technology is prior art to any embodiment(s) included in this disclosure. Neither is the "Summary" to be considered as an exhaustive characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

What is claimed:

1. A support bracket, comprising:
    (a) a first supportive section, wherein the first section includes:
        (i) a middle portion positioned between a first side portion and a second side portion, wherein the middle portion further includes a semi-cylindrical channel formed vertically therein;
        (ii) wherein the first side portion is angled in an upward orientation relative to the middle portion, wherein the first side portion has a height and a width, and wherein the first side portion further includes:
            a) an angled slot formed through a portion of the width of the first portion;
            b) an angled semi-cylindrical channel formed through the height of the first portion;
            c) wherein the slot and the semi-cylindrical channel intersect one another in a perpendicular manner; and
        (iii) wherein the second side portion is angled in an upward orientation relative to the middle portion, wherein the second side portion has a height and a width, and wherein the second side portion further includes:
            a) an angled slot formed through a portion of the width of the second portion;
            b) an angled semi-cylindrical channel formed through the height of the second portion;
            c) wherein the slot and the semi-cylindrical channel intersect one another in a perpendicular manner; and
    (b) a second supportive section, wherein the second section is adapted to be attached to the first section in a reversed and opposite configuration, and wherein the second section includes:
        (i) a middle portion positioned between a first side portion and a second side portion, wherein the middle portion further includes a semi-cylindrical channel formed vertically therein;
        (ii) wherein the first side portion is angled in an upward orientation relative to the middle portion, wherein the first side portion has a height and a width, and wherein the first side portion further includes:

a) an angled slot formed through a portion of the width of the first portion;
b) an angled semi-cylindrical channel formed through the height of the first portion;
c) wherein the slot and the semi-cylindrical channel intersect one another in a perpendicular manner; and
(iii) wherein the second side portion is angled in an upward orientation relative to the middle portion, wherein the second side portion has a height and a width, and wherein the second side portion further includes:
a) an angled slot formed through a portion of the width of the second portion;
b) an angled semi-cylindrical channel formed through the height of the second portion;
c) wherein the slot and the semi-cylindrical channel intersect one another in a perpendicular manner.

2. The support bracket of claim 1, wherein the first section and the second section are either detachably connected to one another or permanently attached to one another in a non-detachable manner.

3. The support bracket of claim 1, wherein the first and the second section each further include at least one aperture formed therein, and wherein the at least one aperture is adapted to receive an attachment member therein or therethrough.

4. The support bracket of claim 1, further including two pivot devices mounted therein, wherein each pivot device is attached to a leg assembly, wherein each pivot device includes a flange and a stem positioned beneath the flange, wherein the flanges correspond to the slots formed in the first and second supportive sections, and wherein the stems correspond to the semi-cylindrical channels formed in the first and second supportive sections.

5. The support bracket of claim 4, wherein each pivot device further includes a leg receiving portion positioned beneath the stem, and wherein the leg receiving portion is adapted to receive at least two legs therein.

6. The support bracket of claim 4, wherein the leg assembly is triangular in shape and further includes two legs and a cross bar positioned between the two legs.

7. The support bracket of claim 1, wherein the semi-cylindrical channels formed vertically in the middle portion of each bracket section are adapted to receive a support post therein.

8. The support bracket of claim 7, wherein the support post is adapted to support a satellite dish, a parabolic acoustic disc, or a parabolic mirror.

9. A support bracket for use with self-leveling devices, comprising:
(a) a vertically-oriented first support section, wherein the vertically-oriented first support section includes:
(i) a middle portion positioned between a first side portion and a second side portion, wherein the middle portion further includes a semi-cylindrical channel formed vertically therein;
(ii) wherein the first side portion is angled in an upward orientation relative to the middle portion, wherein the first side portion has a height and a width, and wherein the first side portion further includes:
a) an angled slot formed through a portion of the width of the first portion;
b) an angled semi-cylindrical channel formed through the height of the first portion;
c) wherein the slot and the semi-cylindrical channel intersect one another in a perpendicular manner; and
(iii) wherein the second side portion is angled in an upward orientation relative to the middle portion, wherein the second side portion has a height and a width, and wherein the second side portion further includes:
a) an angled slot formed through a portion of the width of the second portion;
b) an angled semi-cylindrical channel formed through the height of the second portion;
c) wherein the slot and the semi-cylindrical channel intersect one another in a perpendicular manner; and
(b) a vertically-oriented second support section, wherein the vertically-oriented second support section is adapted to be permanently or non-permanently attached to the first section in a reversed and opposite configuration, and wherein the second section includes:
(i) a middle portion positioned between a first side portion and a second side portion, wherein the middle portion further includes a semi-cylindrical channel formed vertically therein;
(ii) wherein the first side portion is angled in an upward orientation relative to the middle portion, wherein the first side portion has a height and a width, and wherein the first side portion further includes:
a) an angled slot formed through a portion of the width of the first portion;
b) an angled semi-cylindrical channel formed through the height of the first portion;
c) wherein the slot and the semi-cylindrical channel intersect one another in a perpendicular manner; and
(iii) wherein the second side portion is angled in an upward orientation relative to the middle portion, wherein the second side portion has a height and a width, and wherein the second side portion further includes:
a) an angled slot formed through a portion of the width of the second portion;
b) an angled semi-cylindrical channel formed through the height of the second portion;
c) wherein the slot and the semi-cylindrical channel intersect one another in a perpendicular manner; and
(c) two pivot devices mounted in the support sections, wherein each pivot device is attached to a leg assembly, wherein each pivot device includes a flange and a stem positioned beneath the flange, wherein the flanges correspond to the slots formed in the first and second support sections, and wherein the stems correspond to the semi-cylindrical channels formed in the first and second support sections.

10. The support bracket of claim 9, wherein the first and the second section each further include at least one aperture formed therein, and wherein the at least one aperture is adapted to receive an attachment member therein or therethrough.

11. The support bracket of claim 9, wherein each pivot device further includes a leg receiving portion positioned beneath the stem, and wherein the leg receiving portion is adapted to receive at least two legs therein.

12. The support bracket of claim 9, wherein the leg assembly is triangular in shape and further includes two legs and a cross bar positioned between the two legs.

13. The support bracket of claim 9, wherein the semi-cylindrical channels formed vertically in the middle portion of each bracket section are adapted to receive a support post therein.

14. The support bracket of claim 13, wherein the support post is adapted to support a satellite dish, a parabolic acoustic disc, or a parabolic mirror.

\* \* \* \* \*